US012689120B2

(12) United States Patent
Zhu et al.

(10) Patent No.: US 12,689,120 B2
(45) Date of Patent: Jul. 21, 2026

(54) CONTROLLING A RECONFIGURABLE INTELLIGENT SURFACE DEVICE

(71) Applicant: LENOVO (BEIJING) LIMITED, Beijing (CN)

(72) Inventors: Chenxi Zhu, Fairfax, VA (US); Bingchao Liu, Beijing (CN); Yi Zhang, Beijing (CN)

(73) Assignee: Lenovo (Beijing) Limited, Beijing (CN)

(*) Notice: Subject to any disclaimer, the term of this patent is extended or adjusted under 35 U.S.C. 154(b) by 324 days.

(21) Appl. No.: 18/555,586

(22) PCT Filed: Apr. 16, 2021

(86) PCT No.: PCT/CN2021/087771
§ 371 (c)(1),
(2) Date: Oct. 16, 2023

(87) PCT Pub. No.: WO2022/217584
PCT Pub. Date: Oct. 20, 2022

(65) Prior Publication Data
US 2024/0204398 A1    Jun. 20, 2024

(51) Int. Cl.
*H01Q 3/00*      (2006.01)
*H01Q 1/24*      (2006.01)
(Continued)

(52) U.S. Cl.
CPC ............. *H01Q 3/005* (2013.01); *H01Q 1/246* (2013.01); *H01Q 3/22* (2013.01); *H04B 7/04013* (2023.05)

(58) Field of Classification Search
CPC .......... H01Q 3/005; H01Q 1/246; H01Q 3/22; H04B 7/04013; H04B 7/15528
(Continued)

(56) References Cited

U.S. PATENT DOCUMENTS

2007/0213013 A1*   9/2007   Kim ..................... H04B 7/0663
                                                                455/69

FOREIGN PATENT DOCUMENTS

CN        111983560  A      11/2020
CN        112073092  A      12/2020
(Continued)

OTHER PUBLICATIONS

Cao et al., "Reconfigurable Intelligent Surface-Assisted MAC for Wireless Networks: Protocol Design, Analysis, and Optimization", IEEE Internet of Things Journal, vol. 8, No. 18, Sep. 15, 2021, pp. 1-29.
(Continued)

*Primary Examiner* — Tanmay K Shah
(74) *Attorney, Agent, or Firm* — Kunzler Needham & Hilton

(57)                ABSTRACT

Apparatuses, methods, and systems are disclosed for controlling a reconfigurable intelligent surface device. One method includes determining a control signal for a reconfigurable intelligent surface device to control a parameter of at least one element of a plurality of elements of the reconfigurable intelligent surface device. The parameter includes information indicating a phase angle. The method includes transmitting the control signal to the reconfigurable intelligent surface device to control the parameter of the at least one element of the reconfigurable intelligent surface device.

14 Claims, 10 Drawing Sheets

800

Begin

802 — Determine A Control Signal For A Reconfigurable Intelligent Surface Device To Control A Parameter Of At Least One Element Of A Plurality Of Elements Of The Reconfigurable Intelligent Surface Device, Wherein The Parameter Comprises Information Indicating A Phase Angle 804 — Transmit The Control Signal To The Reconfigurable Intelligent Surface Device To Control The Parameter Of The At Least One Element Of The Reconfigurable Intelligent Surface Device End

(51) Int. Cl.
  *H01Q 3/22* (2006.01)
  *H04B 7/04* (2017.01)
(58) Field of Classification Search
  USPC ........................................................ 455/419
  See application file for complete search history.

(56) References Cited

FOREIGN PATENT DOCUMENTS

| | | | | | |
|---|---|---|---|---|---|
| CN | 112153653 | A | | 12/2020 | |
| CN | 112272183 | A | | 1/2021 | |
| CN | 113068197 | A | * | 7/2021 | ............ H04W 16/28 |
| CN | 113645163 | A | * | 11/2021 | ............ H04W 24/02 |
| WO | 2021071141 | A1 | | 4/2021 | |

OTHER PUBLICATIONS

Mhanna et al., "Distributed Stochastic Phase-Shift Optimization in a RIS-Assisted Cellular Network", IEEE Wireless Communications and Networking Conference, 2021, pp. 1-7.
PCT/CN2021/087771, "International Search Report and the Written Opinion of the International Searching Authority, or the Declaration", International Searching Authority, Jan. 19, 2022, pp. 1-7.

* cited by examiner

100

104

104

102

104

RIS
Device
106

102

102

200

300

350

700

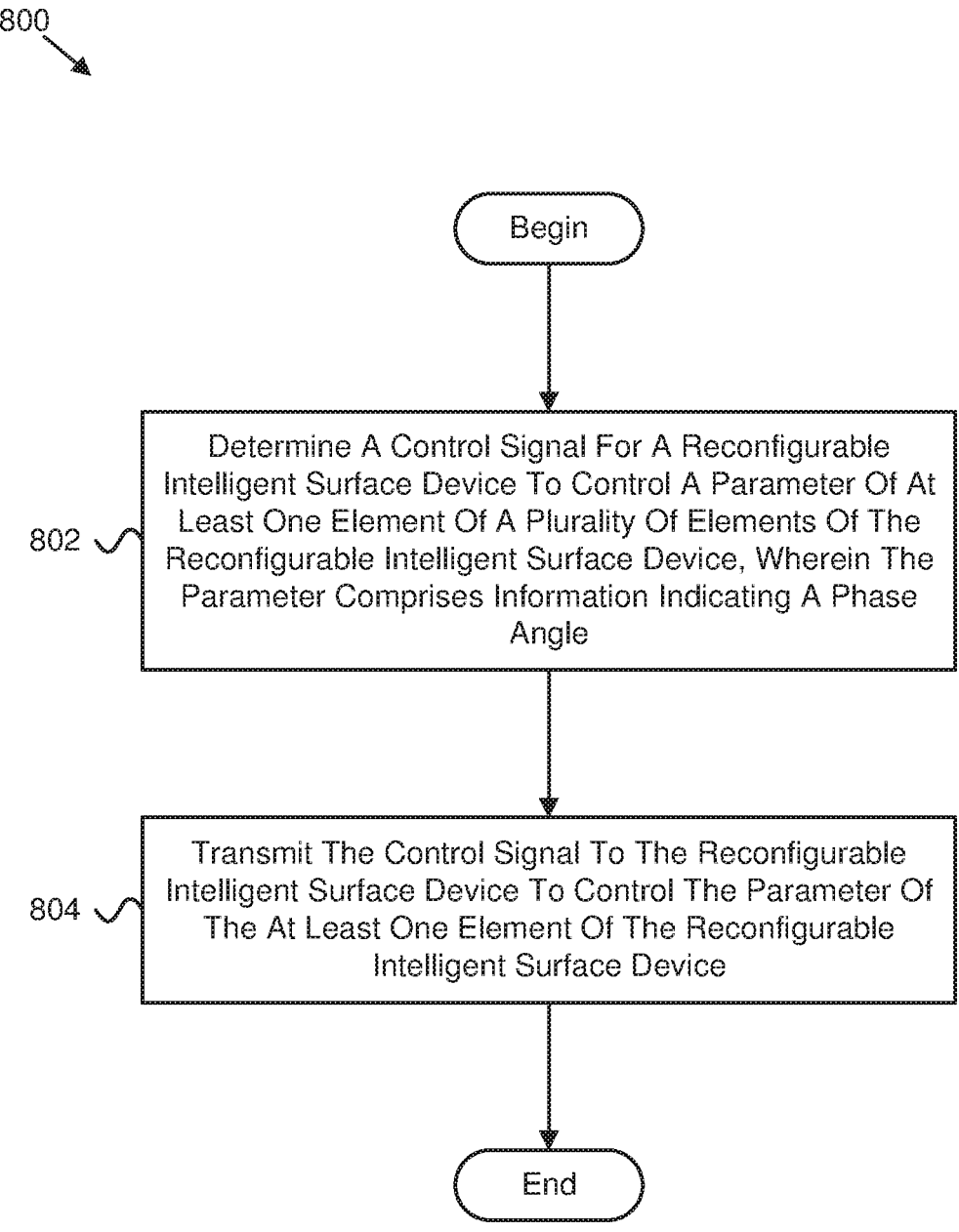

800

Begin

802

Determine A Control Signal For A Reconfigurable Intelligent Surface Device To Control A Parameter Of At Least One Element Of A Plurality Of Elements Of The Reconfigurable Intelligent Surface Device, Wherein The Parameter Comprises Information Indicating A Phase Angle

804

Transmit The Control Signal To The Reconfigurable Intelligent Surface Device To Control The Parameter Of The At Least One Element Of The Reconfigurable Intelligent Surface Device End

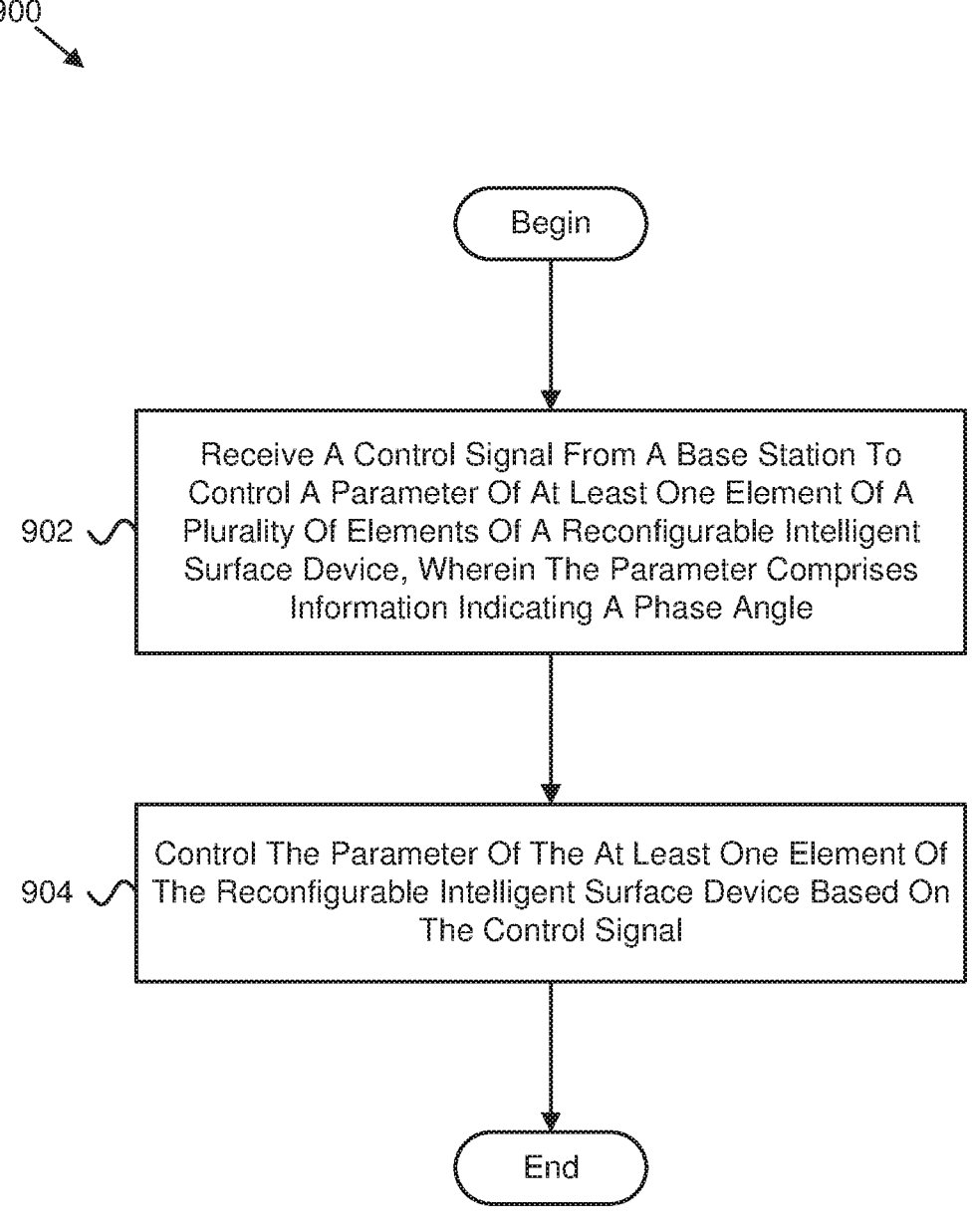

Begin

902 Receive A Control Signal From A Base Station To Control A Parameter Of At Least One Element Of A Plurality Of Elements Of A Reconfigurable Intelligent Surface Device, Wherein The Parameter Comprises Information Indicating A Phase Angle 904 Control The Parameter Of The At Least One Element Of The Reconfigurable Intelligent Surface Device Based On The Control Signal End

FIG. 9

CONTROLLING A RECONFIGURABLE INTELLIGENT SURFACE DEVICE

FIELD

The subject matter disclosed herein relates generally to wireless communications and more particularly relates to controlling a reconfigurable intelligent surface device.

BACKGROUND

In certain wireless communications networks, large antenna arrays may be used for high frequency transmission and/or reception. For example, large antenna arrays may be used for transmission and/or reception of signals that operate in a Terahertz band. Signals transmitted may have low power.

BRIEF SUMMARY

Methods for controlling a reconfigurable intelligent surface device are disclosed. Apparatuses and systems also perform the functions of the methods. In one embodiment, the method includes determining a control signal for a reconfigurable intelligent surface device to control a parameter of at least one element of a plurality of elements of the reconfigurable intelligent surface device, wherein the parameter comprises information indicating a phase angle. In various embodiments, the method includes transmitting the control signal to the reconfigurable intelligent surface device to control the parameter of the at least one element of the reconfigurable intelligent surface device.

An apparatus for controlling a reconfigurable intelligent surface device, in one embodiment, includes a processor configured to determine a control signal for a reconfigurable intelligent surface device to control a parameter of at least one element of a plurality of elements of the reconfigurable intelligent surface device, wherein the parameter comprises information indicating a phase angle. In certain embodiments, the apparatus includes a transmitter configured to transmit the control signal to the reconfigurable intelligent surface device to control the parameter of the at least one element of the reconfigurable intelligent surface device.

In various embodiments, a method for controlling a reconfigurable intelligent surface device includes receiving a control signal from a base station to control a parameter of at least one element of a plurality of elements of a reconfigurable intelligent surface device, wherein the parameter comprises information indicating a phase angle. In certain embodiments, the method includes controlling the parameter of the at least one element of the reconfigurable intelligent surface device based on the control signal.

In some embodiments, an apparatus for controlling a reconfigurable intelligent surface device includes a receiver configured to receive a control signal from a base station to control a parameter of at least one element of a plurality of elements of a reconfigurable intelligent surface device, wherein the parameter comprises information indicating a phase angle. In various embodiments, the apparatus includes a processor configured to control the parameter of the at least one element of the reconfigurable intelligent surface device based on the control signal.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 8 is a schematic flow chart diagram illustrating one embodiment of a method for controlling a reconfigurable intelligent surface device; and FIG. 9 is a schematic flow chart diagram illustrating another embodiment of a method for controlling a reconfigurable intelligent surface device.

DETAILED DESCRIPTION

Figure 1:
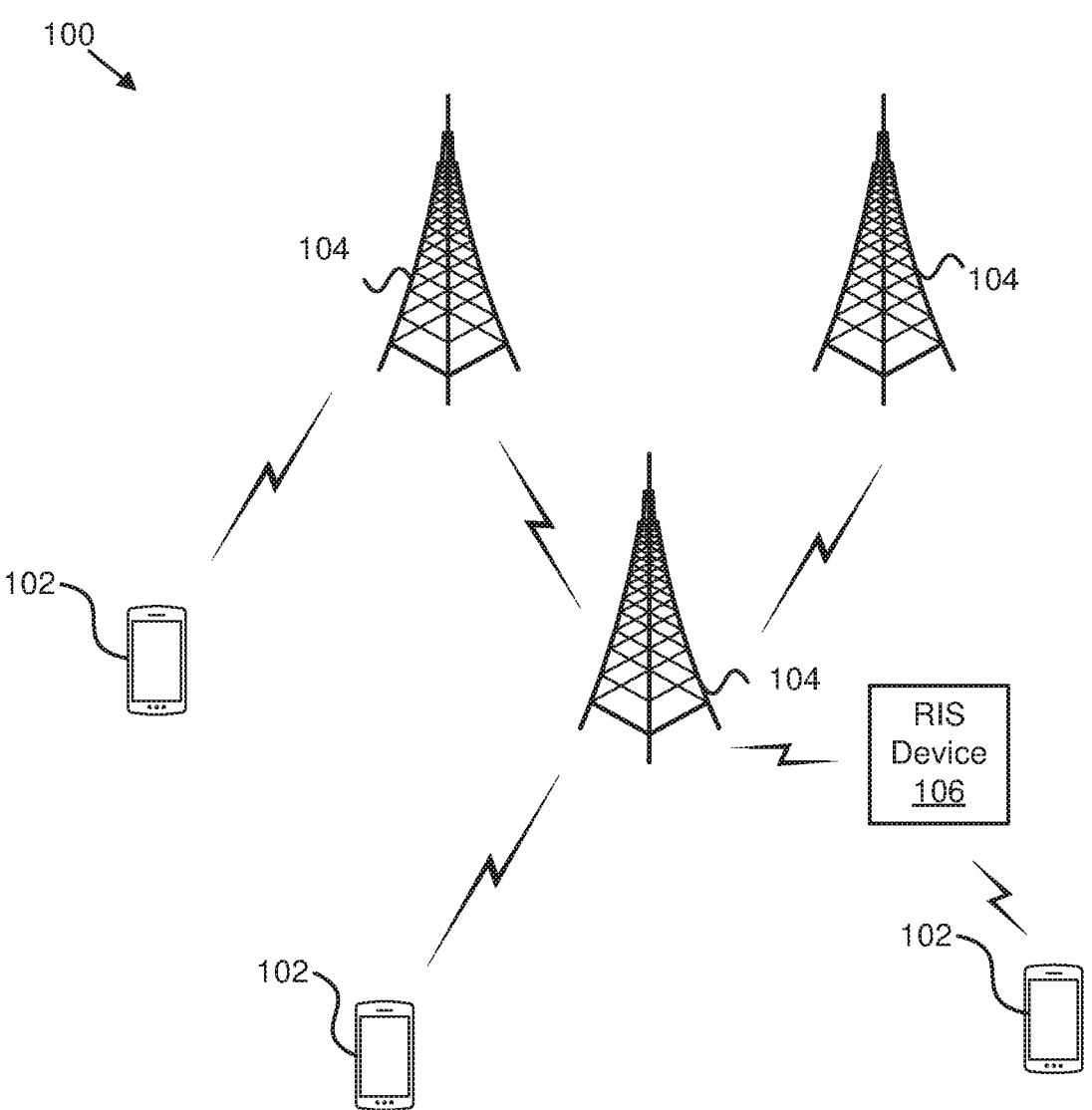
FIG. 1 is a schematic block diagram illustrating one embodiment of a wireless communication system for controlling a reconfigurable intelligent surface device.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/ acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for controlling a reconfigurable intelligent surface device. In one embodiment, the wireless communication system 100 includes remote units 102, network units 104, and RIS devices 106. Even though a specific number of remote units 102, network units 104, and RIS devices 106 are depicted in FIG. 1, one of skill in the art will recognize that any number of remote units 102, network units 104, and RIS devices 106 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle onboard computers, network devices (e.g., routers, switches, modems), IoT devices, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via uplink ("UL") communication signals and/or the remote units 102 may communicate directly with other remote units 102 via sidelink communication.

The network units 104 may be distributed over a geographic region. In certain embodiments, a network unit 104 may also be referred to as an access point, an access terminal, a base, a base station, a Node-B, an eNB, a gNodeB ("gNB"), a Home Node-B, a RAN, a relay node, a device, a network device, an integrated and access backhaul ("IAB") node, a donor IAB node, a reconfigurable intelligent surface ("RIS"), or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with the 5G or NG (Next Generation) standard of the third generation partnership program ("3GPP") protocol, wherein the network unit 104 transmits using NG RAN technology. More generally, however, the wireless communication system 100 may implement some other open or proprietary communication protocol, for example, WiMAX, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit downlink ("DL") communication signals to serve the remote units 102 in the time, frequency, and/or spatial domain.

The RIS devices 106 may be any suitable reconfigurable intelligent surface, such as a smart surface ("SS"), a large intelligent surface ("LIS"), an intelligent reflecting surface ("IRS"), and so forth. A reconfigurable intelligent surface may mean a device having one or more elements (e.g., programmable elements) that are configured to reflect a signal in a manner that the signal is boosted upon reflection.

The network units 104 may communicate with the remote units 102 by transmissions transmitted toward RIS devices 106, with the RIS devices 106 reflecting and boosting the received transmissions that are directed toward the remote units 102. Furthermore, the remote units 102 may communicate with the network units 104 by transmissions transmitted toward RIS devices 106, with the RIS devices 106 reflecting and boosting the received transmissions that are directed toward the network units 104. As may be appreciated, the RIS devices 106 may receive transmissions comprising control signals from one or more network units 104 to control its configuration.

In various embodiments, a remote unit 102 and/or a network unit 104 may determine a control signal for a reconfigurable intelligent surface device to control a parameter of at least one element of a plurality of elements of the reconfigurable intelligent surface device. The parameter includes information indicating a phase angle. In various embodiments, the remote unit 102 and/or the network unit 104 may transmit the control signal to the reconfigurable intelligent surface device to control the parameter of the at least one element of the reconfigurable intelligent surface device. Accordingly, a remote unit 102 and/or a network unit 104 may be used for controlling a reconfigurable intelligent surface device.

In some embodiments, a network unit 104 (e.g., a RIS device) may receive a control signal to control a parameter of at least one element of a plurality of elements of a reconfigurable intelligent surface device. The parameter includes information indicating a phase angle. In certain embodiments, the network unit 104 may control the parameter of the at least one element of the reconfigurable intelligent surface device based on the control signal. Accordingly, a network unit 104 may be used for controlling a reconfigurable intelligent surface device.

Figure 2:
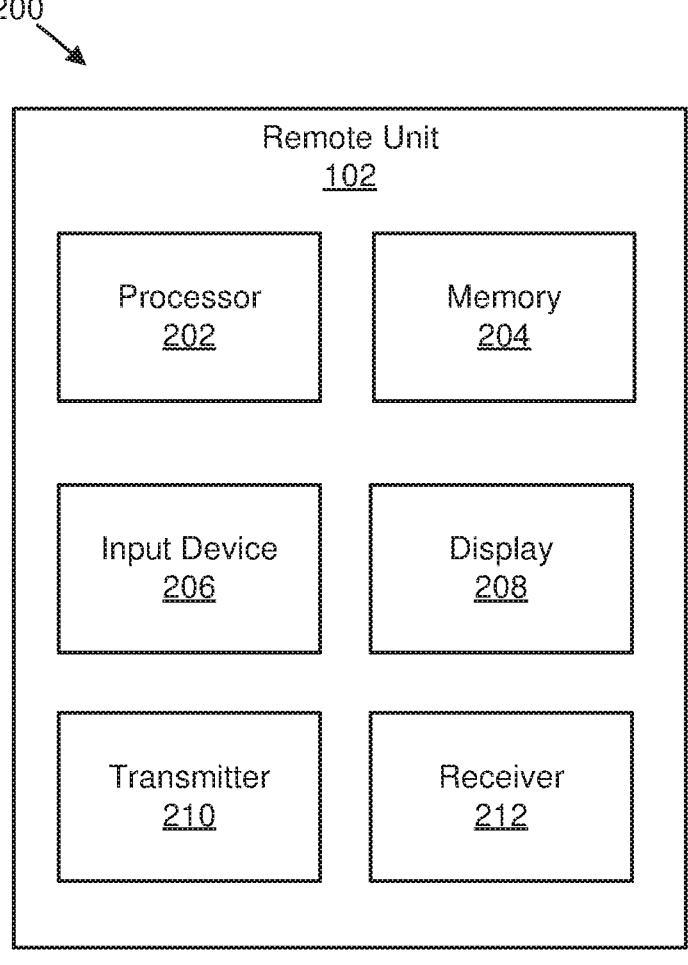
FIG. 2 is a schematic block diagram illustrating one embodiment of an apparatus that may be used for controlling a reconfigurable intelligent surface device.

FIG. 2 depicts one embodiment of an apparatus 200 that may be used for controlling a reconfigurable intelligent surface device. The apparatus 200 includes one embodiment of the remote unit 102. Furthermore, the remote unit 102 may include a processor 202, a memory 204, an input device

206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, a liquid crystal display ("LCD") display, an LED display, an organic light emitting diode ("OLED") display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

In various embodiments, the processor 202 is configured to determine a control signal for a reconfigurable intelligent surface device to control a parameter of at least one element of a plurality of elements of the reconfigurable intelligent surface device. The parameter includes information indicating a phase angle. In certain embodiments, the transmitter 210 is configured to transmit the control signal to the reconfigurable intelligent surface device to control the parameter of the at least one element of the reconfigurable intelligent surface device.

Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3A:
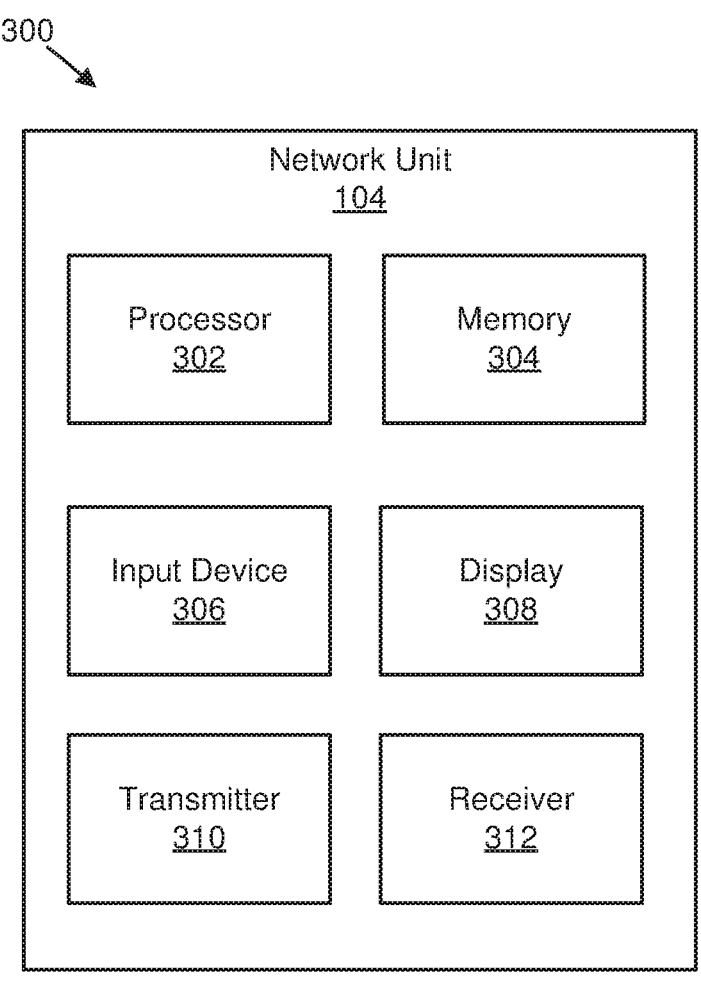
FIG. 3A is a schematic block diagram illustrating another embodiment of an apparatus that may be used for controlling a reconfigurable intelligent surface device.

FIG. 3A depicts another embodiment of an apparatus 300 that may be used for controlling a reconfigurable intelligent surface device. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In various embodiments, the processor 302 is configured to determine a control signal for a reconfigurable intelligent surface device to control a parameter of at least one element of a plurality of elements of the reconfigurable intelligent surface device. The parameter includes information indicating a phase angle. In certain embodiments, the transmitter 310 is configured to transmit the control signal to the reconfigurable intelligent surface device to control the parameter of the at least one element of the reconfigurable intelligent surface device.

In some embodiments, the receiver 312 is configured to receive a control signal (e.g., from a remote unit 102, from a network unit 104) to control a parameter of at least one element of a plurality of elements of a reconfigurable intelligent surface device. The parameter includes information indicating a phase angle. In various embodiments, the processor 302 is configured to control the parameter of the at least one element of the reconfigurable intelligent surface device based on the control signal.

Although only one transmitter 310 and one receiver 312 are illustrated, the network unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

Figure 3B:
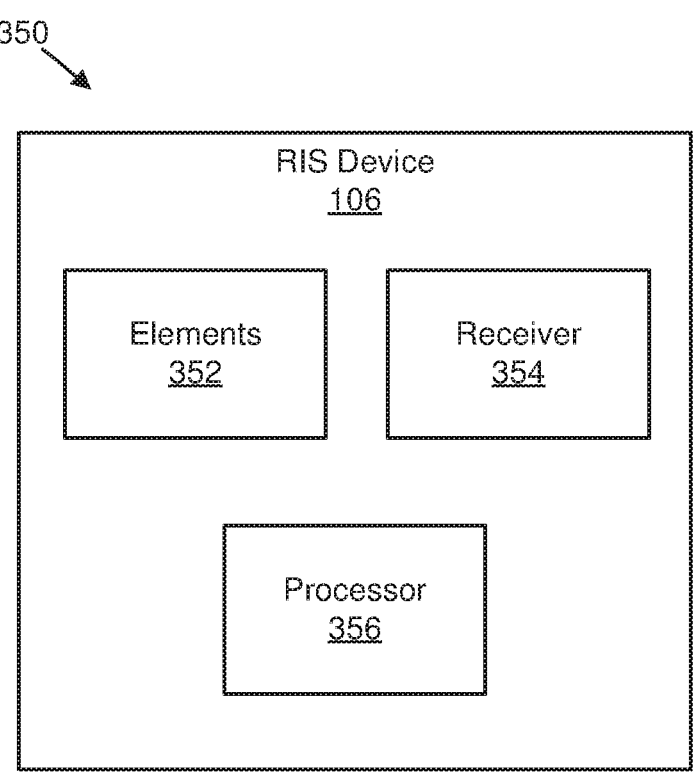
FIG. 3B is a schematic block diagram illustrating one embodiment of an apparatus including a reconfigurable intelligent surface device.

FIG. 3B is a schematic block diagram illustrating one embodiment of an apparatus 350 including one embodiment of the reconfigurable intelligent surface ("RIS") device 106. Furthermore, the RIS device 106 may include elements 352, a receiver 354, and a processor 356. As may be appreciated, in some embodiments, the processor 356 and the receiver 354 may be substantially similar to the processor 202 and the receiver 212 of the remote unit 102, respectively. In various embodiments, the elements 352 include one or more programmable and/or controllable elements. A number of elements 352 may be at least one hundred, at least one thousand, many thousands, and so forth. In certain embodiments, each of the elements 352 may be individually programmed and/or controlled by properties to facilitate reflecting and boosting transmissions that are directed toward a corresponding element. In various embodiments, two or more elements 352 may be grouped together into one or more groups of elements. In such embodiments, the one or more groups of elements may be individually programmed and/or controlled by properties to facilitate reflecting and boosting transmissions that are directed toward elements of the corresponding group. The receiver 354 may be any suitable wireless or wired receiver configured to receive control signals for programming and/or controlling the elements 352. The processor 356 may be any suitable hardware and/or software device that can receive the control signals for programming and/or controlling the elements 352 and provide information to the elements 352 for controlling and/or programming the elements.

In various embodiments, there may be a high data rate and/or large capacity in wireless communications. In certain embodiments, such as in 5G NR, there may be diverse requirements for enhanced mobile broadband ("eMBB"), ultra-reliable low-latency communication ("URLLC"), and massive machine type communications ("mMTC") and/or a high data throughput to more users and for more industrial internet of things ("IIoT") verticals. Such embodiments may be achieved with wide carrier bandwidth, massive MIMO, millimeter waves and additional spectrums (e.g., unlicensed spectrum). In some embodiments, between 400 MHz (e.g., frequency range 1 ("FR1"), frequency division duplexing ("FDD")) to 1 GHZ (e.g., frequency range 2 ("FR2"), time division duplexing ("TDD")) bandwidth may be used to provide a 20 Gbps DL rate per cell. In various embodiments, with more applications deployed over wireless networks (e.g., IIoT applications including self-driving cars, factory automation, telemedicine and others), support for data rates of 1000 Gbps or higher in a cell may be provided. In certain embodiments, a Terahertz ("THz") band (e.g., 0.1 to 10 THz) may be used.

It should be noted that, compared with microwave and mmW, a THz channel may be characterized by directivity, atmospheric absorption, scintillation, scattering, and reflection.

According to the Friis formula on free space propagation $$-P_r = P_t \left(\frac{\lambda}{4\pi R}\right)^2 G_t G_r,$$

where $\lambda$ is wavelength, $G_t$ and $G_r$ are the directional gains of transmit or transmitter ("TX") and receive or receiver ("RX") antennas. At a scattering limit, antenna gain may be determined by wavelength and effective antenna aperture $A_{eff}$ where $$G = \frac{4\pi A_{eff}}{\lambda^2}.$$

As may be appreciated, with a TX antenna and an RX antenna pointing to each other, an overall path loss decreases with the wavelength as follows:

$$P_r = P_t \frac{A_t A_r}{(\lambda R)^2}.$$

It should be noted that, besides free space loss, THz propagation may be impacted by atmospheric absorption including $H_2O$ and $O_2$ molecules.

In some embodiments, large pathloss (e.g., including absorption) coupled with low output power may make it necessary to use many power amplifiers ("PAs") to produce a required effective isotropic radiated power ("EIRP") for a transmitter. Massive MIMO with hundreds of antenna elements has been successfully used in the mmW range. In the THz range, an antenna array size may have more antenna elements than used with massive MIMO (e.g., thousands of antenna elements). In certain embodiments, a large antenna array may not only perform the task of spatial power combining from many low power PAs, but may also provide directional gain to facilitate compensating for large pathloss.

In various embodiments, a RIS (e.g., smart surface ("SS"), large intelligent surface ("LIS"), intelligent reflecting surface ("IRS")) may be a technology used in wireless networks. In such embodiments, the RIS may be a large smart surface placed in a wireless propagation environment as an artificial and programmable reflector to boost a radio signal from a transmitter to a receiver. In some embodiments, a RIS may have a planar 2 dimensional array of metaatoms (e.g., unit cell, elements) in which each passive element (or group of elements) may be set to one of several states with different reflecting coefficients. Together, the metaatoms give the RIS a macro-property to manipulate an impinge electromagnetic ("EM") wave and divert it in a direction of an intended receiver. This may improve the performance at the receiver and/or reduce interference to other users.

In certain embodiments, a RIS may be used in a very high frequency range (e.g., THz). As a size of an antenna array increases, a spatial and/or angular resolution of the array improves as a result of array signal processing. Moreover, singular modes of a channel between a large TX antenna array and a large RX antenna array includes a set of TX beams (e.g., angle of departures ("AoDs") from the TX side). Different TX beams may be naturally orthogonal and no separate precoder may be required. A channel from the TX to the RX may include reflection on a RIS. An RIS may be designed for a THz range.

For a channel between a TX and a RX, the channel includes a set of discrete paths:

$$H(t, f) = \sum_{n=1}^{N_P} \beta_n a_R(\theta_n^R) a_T{}^H(\theta_n^T) e^{j2\pi v_n t} e^{-j2\pi \tau_n f}.$$

If a 1D update location answer ("ULA") array is deployed at a TX and a RX, then $A_T = DFT_{N_T} \cdot A_R = DFT_{N_R}$, where $DFT_N$ is a discrete Fourier transform ("DFT") matrix of size N.

$$\hat{H} = DFT_{N_R} \cdot H \cdot DFT_{N_T}^H \qquad (1)$$

Equation (1) is a matrix of $N_R \times N_T$. The Np physical paths are partitioned into disjoint subsets distributed in total $N_R N_T$ bins in an angular domain. For a sparse channel, most elements of H are zero, except those correspond to a path falling into the bin corresponding to a range of (AoD, AoA):

$$H_v(i, k) = \sum_{n=1}^{N_p} \beta_n f_{N_R}\left(\frac{i}{N_R} - \theta_n^R\right) f_{N_T}\left(\frac{k}{N_T} - \theta_k^T\right) \approx \sum_{n \in S_{R,i} \cap S_{T,k}} \beta_n.$$

This makes $\tilde{H}$ a virtual channel with discrete AoD and/or AoA angles. Based on this, the reflection channel on a RIS surface may be modelled. For example, assume the RIS surface includes a 1D array of $N_S$ RIS elements in which the reflection coefficient of each element may be individually set. The composite channel from the TX to the RX through RIS is shown in Equation (2), where $H_2$, $H_\phi$, $H_1$ are shown in FIG. 4.

$$H = H_2 H_\phi H_1 \qquad (2)$$

Figure 4:
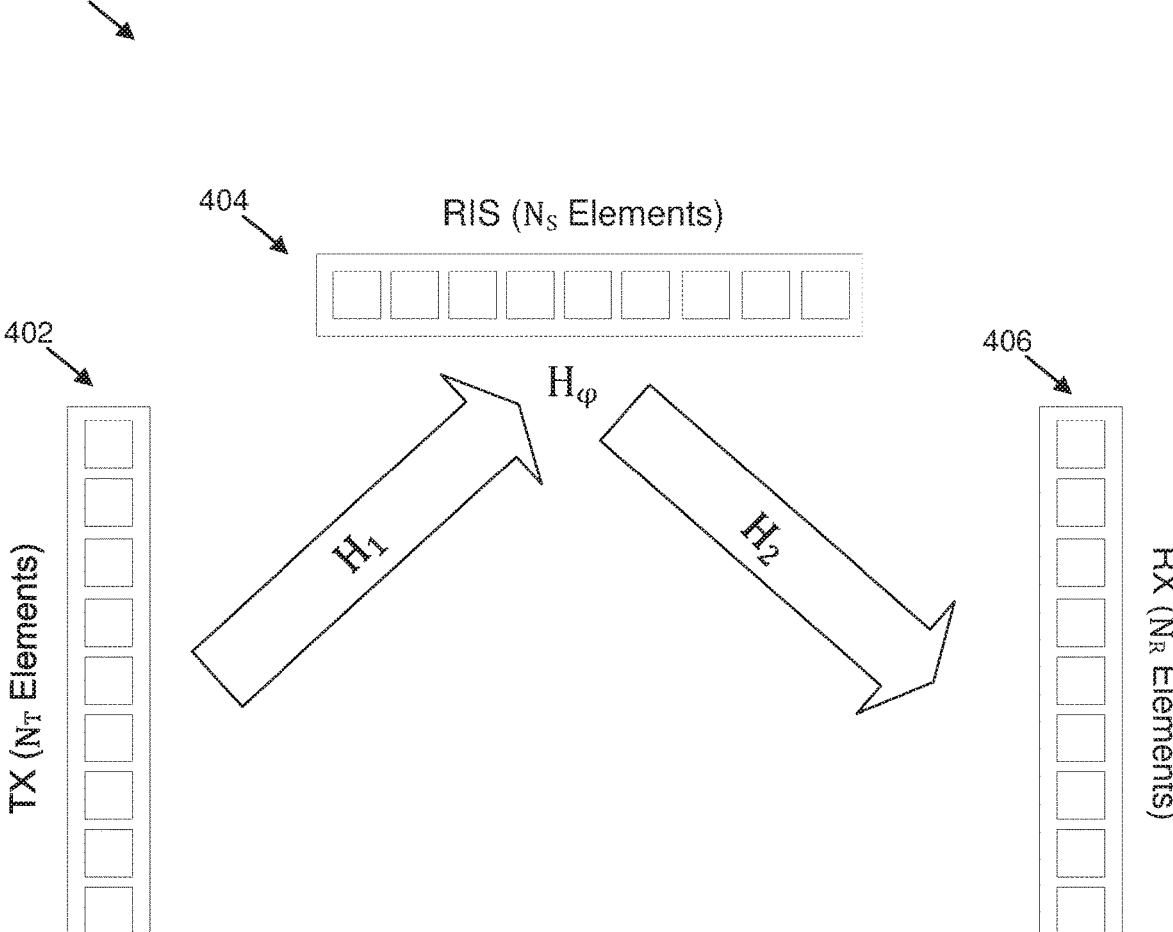
FIG. 4 is a schematic block diagram illustrating one embodiment of a reflection channel on a RIS.

FIG. 4 is a schematic block diagram 400 illustrating one embodiment of a reflection channel on a RIS. The diagram 400 includes a TX antenna 402 having multiple antenna elements (e.g., $N_T$ elements). While only nine antenna elements are illustrated, the TX antenna 402 may have at least a hundred, a thousand, or more antenna elements. Moreover, the diagram 400 includes an RIS 404 having multiple antenna elements (e.g., $N_S$ elements). While only nine antenna elements are illustrated, the RIS 404 may have at least a hundred, a thousand, or more antenna elements. The diagram 400 also includes an RX antenna 406 having multiple antenna elements (e.g., NR elements). While only nine antenna elements are illustrated, the RX antenna 406 may have at least a hundred, a thousand, or more antenna elements. Various signal paths $H_1$ may occur between the antenna elements of the TX antenna 402 and the RIS 404, and various signal paths $H_2$ may occur between the antenna elements of the RIS 404 and the RX antenna 406. An angle between the signal paths $H_1$ and $H_2$ may be $H_\phi$. The TX antenna 402 may be located at a user equipment ("UE") and/or a gNB. Moreover, the RX antenna 406 may be located at the UE and/or the gNB.

A virtual representation of the channel from TX to RX reflected on the RIS may be:

$$\tilde{H} = \tilde{H}_2 \tilde{H}_\phi \tilde{H}_1 =$$

$$A_R H_{v2} A_S^H H_\phi A_S H_{v1} A_T^H = DFT_{N_R} \cdot H_{v2} \cdot DFT_{N_S}^H \cdot H_\phi \cdot DFT_{N_S} \cdot H_{v1} \cdot DFT_{N_T}^H.$$

$H_\phi = \text{diag}(e^{j\Phi_S}) = \text{diag}([e^{j\Phi_1}, e^{j\Phi_2}, \ldots, e^{j\Phi N_S}])$ may be the encoding of the $N_S$ elements of the RIS. $\tilde{H}$ may be solved as a function of $H_\phi$ to maximize the rank 1 capacity of the channel $\tilde{H}$.

In certain embodiments, because most of the elements in $H_1$ and $H_2$ are zero, the matrix $$DFT_{N_S}^H \cdot H_\phi \cdot DFT_{N_S}$$

may match the non-zero elements of $H_1$ and $H_2$ so the total capacity of $\tilde{H}$ is maximized. This requires the matrix $$DFT_{N_S}^H \cdot H_\phi^* \cdot DFT_{N_S} = CI_{N_S,k}$$

to be a cyclic shift matrix, $CI_{N,k}$ is the matrix obtained by cyclic shift the identity matrix of size N to the right by k columns:

$$CI_{N,k} = \begin{bmatrix} 0 & \ldots & 1 & 0 & \ldots & 0 \\ 0 & 0 & \ldots & 1 & 0 & 0 \\ 0 & 0 & 0 & \ldots & 1 & 0 \\ 0 & 0 & 0 & 0 & \ldots & 1 \\ 1 & 0 & 0 & 0 & \ldots & 0 \\ 0 & 1 & 0 & 0 & \ldots & 0 \end{bmatrix}_{N \times N}$$

This gives $$H_\phi^* = DFT_{N_S} CI_{N_S,k} DFT_{N_S}^H.$$

Using the property of DFT matrix, $H_\phi^*$ takes the form: $H_\phi^* = \text{diag}([1, e^{j\Phi_c}, e^{j2\Phi_c}, \ldots, e^{j(N_S-1)\Phi_c}])$, where $$\phi_c = 2\pi \frac{N_c}{N_S}$$

for some integer $N_c$.

With $H_\phi^*$, the RIS surface takes an incident beam of $H_1$ and reflects it towards the direction of an outgoing beam of $H_2$.

In certain embodiments, a base station (e.g., the transmitter for the DL or the receiver in the UL) or another device (e.g., remote unit 102, network unit 104) may determine the angle $\phi_c$. In various embodiments, to control an RIS device, a base station or another device (e.g., remote unit 102, network unit 104) may send a control message to the RIS device with the information $\phi_c$. A quantized version of $\phi_c$ may be standardized as part of an air interface between the base station ("BS") and the RIS, and sent from the BS to the RIS in a physical layer, in a MAC layer, or as a radio resource control ("RRC") message.

In some embodiments, on receiving a control message, an RIS device may adjust reflection coefficients of elements on its surface based on oc. This may be realized by various configurations of the RIS.

In certain embodiments, for a RIS having a uniform 1D linear array of antenna elements. Each antenna element may include a tunable metaatom that may change a phase of a reflected EM wave, the $H_\phi^*$ takes the incident beam in with angle of arrival $\theta_{in}$ and reflects it to the direction $\theta_{out}$.

Figure 5:
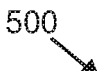
FIG. 5 is a schematic block diagram illustrating one embodiment of reflection on a RIS of a 1D uniform array.
Figure 5:
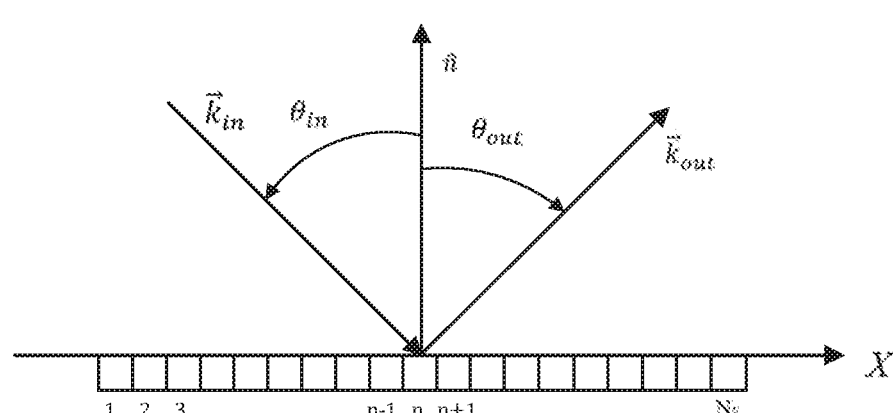

FIG. 5 is a schematic block diagram 500 illustrating one embodiment of reflection on a RIS of a 1D uniform array. In FIG. 5, suppose the direction of the incident EM wave is $\theta_{in}$, and the desired direction of the reflected (e.g., outgoing) wave is $\theta_{out}$ relative to the norm n̂. The wavevector of the incident and reflected wave is $\vec{k}_{in}$ and $\vec{k}_{out}$. Using a far field assumption, a planar EM wave may be represented as: $\vec{E}(\vec{r}, t) = \vec{E}_0 e^{j(2\pi ft - \vec{r} \cdot \vec{k})}$.

To generate the reflected wave in the direction of $\vec{k}_{out}$, a phase difference of the outgoing wave from two adjacent elements, $$\Delta\omega_n^o,$$

may satisfy:

$$\Delta\omega_n^o = \omega_{n+1}^o - \omega_n^o = -\frac{2\pi d \sin\theta_{out}}{\lambda}.$$

The phase difference of the incident wave between adjacent elements is given by:

$$\Delta\omega_n^i = \omega_{n+1}^i - \omega_n^i = -\frac{2\pi d \sin\theta_{in}}{\lambda}.$$

For a transmission type antenna, the incident wave is in the normal direction from the back of the antenna array, and $\theta_{in}=0$. At antenna element n, the reflected wave is given by:

$$\vec{E}_{out}(\vec{r}_t, t) = \vec{E}_{in}(\vec{r}_n, t)G(\theta_{in})G(\theta_{out})R_n e^{j\omega_n^c},$$

where $G(\theta)$ is the antenna gain in direction $\theta$, $R_n$ and $$\Delta\omega_n^o,$$

is the reflectivity and tunable phase shift of element i. $R_n$ may depend on the state of the metaatom.

Focusing on the phase, $$\omega_n^c = \omega_n^o - \omega_n^i, \Delta\omega_n^c = \Delta\omega_n^o - \Delta\omega_n^i = \frac{2\pi d}{\lambda}(\sin\theta_{in} - \sin\theta_{out}).$$

This can be achieved with:

$$\omega_n^c = \frac{2\pi n d}{\lambda}(\sin\theta_{in} - \sin\theta_{out}).$$

Tins is the phase of the metaatom if the phase may be set continuously. If the phase of a metaatom can be only selected from a limited set of values ($\Omega=\{\Omega_1, \ldots, \Omega_N\}$ corresponding to a limited number of states, it is set to the closest value:

$$\Omega_n^c = \mathrm{argmin}_{\Omega_i \in \Omega}|\Omega_i - \omega_n^c|.$$

Figure 6:
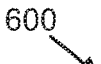
FIG. 6 is a schematic block diagram illustrating one embodiment of a RIS.
Figure 6:
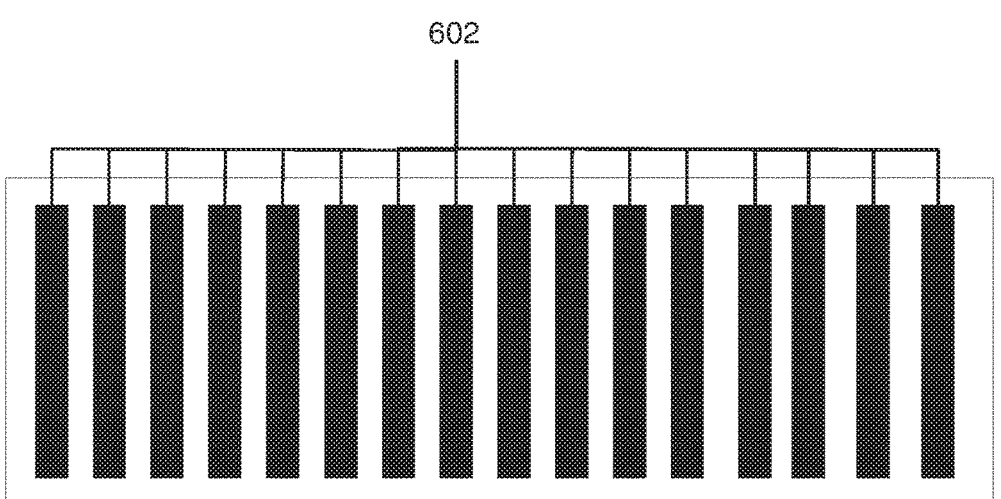
Figure 7:
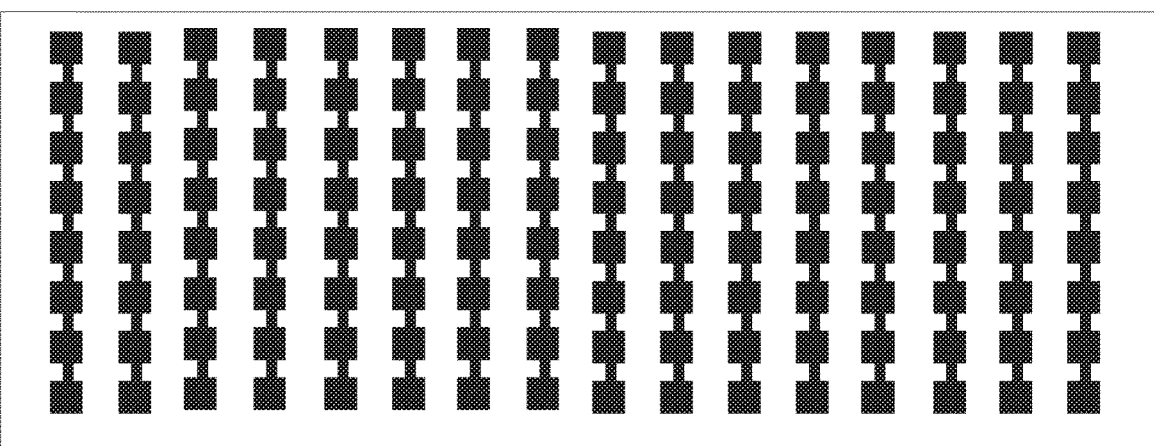
FIG. 7 is a schematic block diagram illustrating another embodiment of a RIS.

FIGS. 6 and 7 show two embodiments of an RIS surface. In FIG. 6, one embodiment of an RIS surface 600 is covered by thin strips 602 of programmable metaatoms arranged uniformly in an X direction. Each metaatom may be programmed individually. In FIG. 7, an RIS surface 700 is covered by small metaatoms arranged in 2D grids, but all the metaatoms in a column are connected and may only be programmed to the same state. Different columns may be programmed to different states.

FIG. 8 a schematic flow chart diagram illustrating one embodiment of a method 800 for controlling a reconfigurable intelligent surface device. In some embodiments, the method 800 is performed by an apparatus, such as the remote unit 102 and/or the network unit 104. In certain embodiments, the method 800 may be performed by a processor executing program code, for example, a microcontroller, a microprocessor, a CPU, a GPU, an auxiliary processing unit, a FPGA, or the like.

In certain embodiments, the method 800 may include determining 802 a control signal for a reconfigurable intelligent surface device to control a parameter of at least one element of a plurality of elements of the reconfigurable intelligent surface device. The parameter includes information indicating a phase angle. In various embodiments, the method 800 includes transmitting 804 the control signal to the reconfigurable intelligent surface device to control the parameter of the at least one element of the reconfigurable intelligent surface device.

In certain embodiments, the phase angle comprises Pc. In some embodiments, the phase angle is determined based on a number of elements of the plurality of elements. In various embodiments, the parameter comprises a quantized value of the phase angle.

In one embodiment, the control signal comprises physical layer signaling, a medium access control message, a radio resource control message, or some combination thereof. In certain embodiments, determining the control signal comprises determining the control signal at a base station.

FIG. 9 is a schematic flow chart diagram illustrating another embodiment of a method 900 for controlling a reconfigurable intelligent surface device. In some embodiments, the method 900 is performed by an apparatus, such as the network unit 104. In certain embodiments, the method 900 may be performed by a processor executing program code, for example, a microcontroller, a microprocessor, a CPU, a GPU, an auxiliary processing unit, a FPGA, or the like.

The method 900 may include receiving 902 a control signal (e.g., from a base station such as a network unit 104, from a remote unit 102) to control a parameter of at least one element of a plurality of elements of a reconfigurable intelligent surface device. The parameter includes information indicating a phase angle. In certain embodiments, the method 900 includes controlling 904 the parameter of the at least one element of the reconfigurable intelligent surface device based on the control signal.

In certain embodiments, the phase angle comprises $\phi_c$. In some embodiments, in response to the control signal comprising Pc, the reconfigurable intelligent surface device applies a coding vector [$1, e^{j\phi_c}, e^{j2\phi_c}, \ldots, e^{j(N_s-1)\phi_c}$] to the plurality of elements. In various embodiments, the method 900 further comprises, in response to the at least one element being only programmable to a plurality of states with each state of the plurality of states having a different angle, selecting an angle closest in value to a value in the coding vector.

In one embodiment, the phase angle is determined based on a number of elements of the plurality of elements. In certain embodiments, the parameter comprises a quantized value of the phase angle. In some embodiments, the control signal comprises physical layer signaling, a medium access control message, a radio resource control message, or some combination thereof.

In various embodiments, receiving the control signal comprises receiving the control signal at the reconfigurable intelligent surface device. In one embodiment, the plurality of elements of the reconfigurable intelligent surface device are aligned as a one dimensional uniform array, and each element of the plurality of elements is individually program-mable. In certain embodiments, elements of the plurality of elements of the reconfigurable intelligent surface device are numbered sequentially.

In some embodiments, the plurality of elements of the reconfigurable intelligent surface device are aligned as a two dimensional uniform array having rows and columns. In various embodiments, elements of a single column of the plurality of elements are programed to the same state, and elements of different columns of the plurality of elements are separately programmable. In one embodiment, the columns of the reconfigurable intelligent surface device are numbered sequentially.

In one embodiment, a method comprises: determining a control signal for a reconfigurable intelligent surface device to control a parameter of at least one element of a plurality of elements of the reconfigurable intelligent surface device, wherein the parameter comprises information indicating a phase angle; and transmitting the control signal to the reconfigurable intelligent surface device to control the parameter of the at least one element of the reconfigurable intelligent surface device.

In certain embodiments, the phase angle comprises $\phi c$.

In some embodiments, the control signal comprises information indicating $$\Delta\omega_n^o.$$

In various embodiments, the parameter comprises a quantized value of the phase angle.

In one embodiment, the control signal comprises physical layer signaling, a medium access control message, a radio resource control message, or some combination thereof.

In certain embodiments, determining the control signal comprises determining the control signal at a base station.

In one embodiment, an apparatus comprises: a processor configured to determine a control signal for a reconfigurable intelligent surface device to control a parameter of at least one element of a plurality of elements of the reconfigurable intelligent surface device, wherein the parameter comprises information indicating a phase angle; and a transmitter configured to transmit the control signal to the reconfigurable intelligent surface device to control the parameter of the at least one element of the reconfigurable intelligent surface device.

In certain embodiments, the phase angle comprises $\phi_c$.

In some embodiments, the control signal comprises information indicating $$\Delta\omega_n^o.$$

In various embodiments, the parameter comprises a quantized value of the phase angle.

In one embodiment, the control signal comprises physical layer signaling, a medium access control message, a radio resource control message, or some combination thereof.

In certain embodiments, the processor configured to determine the control signal comprises the processor configured to determine the control signal at a base station.

In one embodiment, a method comprises: receiving a control signal from a base station to control a parameter of at least one element of a plurality of elements of a reconfigurable intelligent surface device, wherein the parameter comprises information indicating a phase angle; and controlling the parameter of the at least one element of the reconfigurable intelligent surface device based on the control signal.

In certain embodiments, the phase angle comprises $\phi_c$.

In some embodiments, in response to the control signal comprising Pc, the reconfigurable intelligent surface device applies a coding vector $[1, e^{j\phi_c}, e^{j2\phi_c}, \ldots, e^{j(N_s-1)\phi_c}]$ to the plurality of elements.

In various embodiments, the method further comprising, in response to the at least one element being only programmable to a plurality of states with each state of the plurality of states having a different angle, selecting an angle closest in value to a value in the coding vector.

In one embodiment, the control signal comprises information indicating $$\Delta\omega_n^o.$$

In certain embodiments, the parameter comprises a quantized value of the phase angle.

In some embodiments, the control signal comprises physical layer signaling, a medium access control message, a radio resource control message, or some combination thereof.

In various embodiments, receiving the control signal comprises receiving the control signal at the reconfigurable intelligent surface device.

In one embodiment, the plurality of elements of the reconfigurable intelligent surface device are aligned as a one dimensional uniform array, and each element of the plurality of elements is individually programmable.

In certain embodiments, elements of the plurality of elements of the reconfigurable intelligent surface device are numbered sequentially.

In some embodiments, the plurality of elements of the reconfigurable intelligent surface device are aligned as a two dimensional uniform array having rows and columns.

In various embodiments, elements of a single column of the plurality of elements are programed to the same state, and elements of different columns of the plurality of elements are separately programmable.

In one embodiment, the columns of the reconfigurable intelligent surface device are numbered sequentially.

In one embodiment, an apparatus comprises: a receiver configured to receive a control signal from a base station to control a parameter of at least one element of a plurality of elements of a reconfigurable intelligent surface device, wherein the parameter comprises information indicating a phase angle; and a processor configured to control the parameter of the at least one element of the reconfigurable intelligent surface device based on the control signal. In certain embodiments, the phase angle comprises $\phi_c$.

In some embodiments, in response to the control signal comprising $\phi_c$, the reconfigurable intelligent surface device applies a coding vector $[1, e^{j\phi_c}, e^{j2\phi_c}, \ldots, e^{j(N_s-1)\phi_c}]$ to the plurality of elements.

In various embodiments, the processor is configured to, in response to the at least one element being only programmable to a plurality of states with each state of the plurality of states having a different angle, select an angle closest in value to a value in the coding vector.

In one embodiment, the control signal comprises information indicating $$\Delta \omega_n^o.$$

In certain embodiments, the parameter comprises a quantized value of the phase angle.

In some embodiments, the control signal comprises physical layer signaling, a medium access control message, a radio resource control message, or some combination thereof.

In various embodiments, the receiver configured to receive the control signal comprises the receiver configured to receive the control signal at the reconfigurable intelligent surface device.

In one embodiment, the plurality of elements of the reconfigurable intelligent surface device are aligned as a one dimensional uniform array, and each element of the plurality of elements is individually programmable.

In certain embodiments, elements of the plurality of elements of the reconfigurable intelligent surface device are numbered sequentially.

In some embodiments, the plurality of elements of the reconfigurable intelligent surface device are aligned as a two dimensional uniform array having rows and columns.

In various embodiments, elements of a single column of the plurality of elements are programed to the same state, and elements of different columns of the plurality of elements are separately programmable.

In one embodiment, the columns of the reconfigurable intelligent surface device are numbered sequentially.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method performed by a base station, the method comprising:

determining a control signal for a reconfigurable intelligent surface device to control a parameter of at least one element of a plurality of elements of the reconfigurable intelligent surface device, wherein the parameter comprises information indicating a phase angle; and transmitting the control signal to the reconfigurable intelligent surface device to control the parameter of the at least one element of the reconfigurable intelligent surface device, wherein the plurality of elements of the reconfigurable intelligent surface device are aligned as a one dimensional uniform array, and each element of the plurality of elements is individually programmable.

2. The method of claim 1, wherein the phase angle comprises $\phi_c$, and the phase angle is greater than zero.

3. The method of claim 1, wherein the control signal comprises information indicating a phase difference.

4. The method of claim 1, wherein the parameter comprises a quantized value of the phase angle.

5. The method of claim 1, wherein the control signal comprises physical layer signaling, a medium access control message, a radio resource control message, or a combination thereof.

6. A base station, comprising:

at least one memory; and at least one processor coupled with the at least one memory and configured to cause the base station to:

determine a control signal for a reconfigurable intelligent surface device to control a parameter of at least one element of a plurality of elements of the reconfigurable intelligent surface device, wherein the parameter comprises information indicating a phase angle; and transmit the control signal to the reconfigurable intelligent surface device to control the parameter of the at least one element of the reconfigurable intelligent surface device, wherein the plurality of elements of the reconfigurable intelligent surface device are aligned as a one dimensional uniform array, and each element of the plurality of elements is individually programmable.

7. A method for performing a network function, the method comprising:

receiving a control signal from a base station to control a parameter of at least one element of a plurality of elements of a reconfigurable intelligent surface device, wherein the parameter comprises information indicating a phase angle; and controlling the parameter of the at least one element of the reconfigurable intelligent surface device based on the control signal, wherein the plurality of elements of the reconfigurable intelligent surface device are aligned as a one dimensional uniform array, and each element of the plurality of elements is individually programmable.

8. The method of claim 7, wherein, in response to the control signal comprising $\phi_c$, the reconfigurable intelligent surface device applies a coding vector $[1, e^{j\phi_c}, e^{j2\phi_c}, \ldots, e^{j(N_S-1)\phi_c}]$ to the plurality of elements, and $\phi_c$ is greater than zero.

9. The method of claim 8, wherein the method further comprises, in response to the at least one element being only programmable to a plurality of states with each state of the plurality of states having a different angle, selecting an angle closest in value to a value in the coding vector.

10. The method of claim 7, wherein elements of the plurality of elements of the reconfigurable intelligent surface device are numbered sequentially.

11. The base station of claim 6, wherein, in response to the control signal comprising $\phi_c$, the reconfigurable intelligent surface device applies a coding vector $[1, e^{j\phi_c}, e^{j2\phi_c}, \ldots, e^{j(N_S-1)\phi_c}]$ to the plurality of elements, and $\phi_c$ is greater than zero.

12. The base station of claim 11, wherein the at least one processor is configured to cause the base station to, in response to the at least one element being only programmable to a plurality of states with each state of the plurality of states having a different angle, select an angle closest in value to a value in the coding vector.

13. The base station of claim 6, wherein elements of the plurality of elements of the reconfigurable intelligent surface device are numbered sequentially.

14. An apparatus for performing a network function, the apparatus comprising:

at least one memory; and at least one processor coupled with the at least one memory and configured to cause the apparatus to:

receive a control signal from a base station to control a parameter of at least one element of a plurality of elements of a reconfigurable intelligent surface device, wherein the parameter comprises information indicating a phase angle; and control the parameter of the at least one element of the reconfigurable intelligent surface device based on the control signal, wherein the plurality of elements of the reconfigurable intelligent surface device are aligned as a one dimensional uniform array, and each element of the plurality of elements is individually programmable.

* * * * *